United States Patent
Forsberg

(10) Patent No.: US 8,280,247 B1
(45) Date of Patent: Oct. 2, 2012

(54) ARRANGEMENT FOR SUPERVISING AND/OR CONTROLLING THE BIT RATE OF DATA PULSES

(75) Inventor: Gunnar Forsberg, Stockholm (SE)

(73) Assignee: Transmode Systems AB, Stockholm (SE)

( * ) Notice: Subject to any disclaimer, the term of this patent is extended or adjusted under 35 U.S.C. 154(b) by 2554 days.

(21) Appl. No.: 10/130,691

(22) PCT Filed: Nov. 22, 2000

(86) PCT No.: PCT/SE00/02297
§ 371 (c)(1),
(2), (4) Date: Jul. 23, 2002

(87) PCT Pub. No.: WO01/39405
PCT Pub. Date: May 31, 2001

(30) Foreign Application Priority Data

Nov. 22, 1999 (SE) ....................... 9904211

(51) Int. Cl.
*H04B 10/08* (2006.01)
*H04B 17/00* (2006.01)
(52) U.S. Cl. ........................................ 398/27
(58) Field of Classification Search .................... 398/25, 398/23, 27
See application file for complete search history.

(56) References Cited

U.S. PATENT DOCUMENTS

| | | | |
|---|---|---|---|
| 5,678,006 A * | 10/1997 | Valizadeh et al. | 709/223 |
| 5,963,608 A * | 10/1999 | Casper et al. | 375/373 |
| 6,041,056 A * | 3/2000 | Bigham et al. | 370/395.64 |
| 6,108,114 A * | 8/2000 | Gilliland et al. | 398/195 |
| 6,188,680 B1 * | 2/2001 | Ohki | 370/338 |
| 6,324,528 B1 * | 11/2001 | Hillson et al. | 705/400 |
| 6,798,991 B1 * | 9/2004 | Davis et al. | 398/19 |

FOREIGN PATENT DOCUMENTS

| | | |
|---|---|---|
| EP | 0403455 | 12/1990 |
| EP | 0999670 | 5/2000 |
| EP | 1011217 | 6/2000 |
| JP | 6-133145 | 5/1994 |
| JP | 10313277 | 11/1998 |
| JP | 2000040960 | 8/2000 |

OTHER PUBLICATIONS

Newton's Telecom Dictionary, Mar. 1998, Flatiron Publishing, p. 549, item "Physical Layer".*
T.C. Banwell et al., A Programmable Rate Detector for Rapid-Reconfigurable Rate-Transparent Optical Networks, presented at OFC, San Diego, California, Feb. 1999.

(Continued)

Primary Examiner — Shi K Li
(74) Attorney, Agent, or Firm — Murphy & King, P.C.

(57) ABSTRACT

The invention concerns an arrangement for supervising and/or controlling the bit rate of data pulses that are transmitted from a transmitter (16) to at least one optical conduction path (22). The transmitter (16) has an input side (18) which receives electrical pulses from an electric connection (14) and an output side (20) from which light pulses are transmitted in response to the received electrical pulses. The arrangement comprises a supervising unit (24) with at least one input (26) which is suited to be connected to said electric connection (14). The supervising unit (24) is arranged to estimate or determine the bit rate of the pulses that are received at said input (26). The arrangement is arranged to carry out at least one measure which depends on the estimated or determined bit rate.

12 Claims, 2 Drawing Sheets

OTHER PUBLICATIONS

Figure 1:
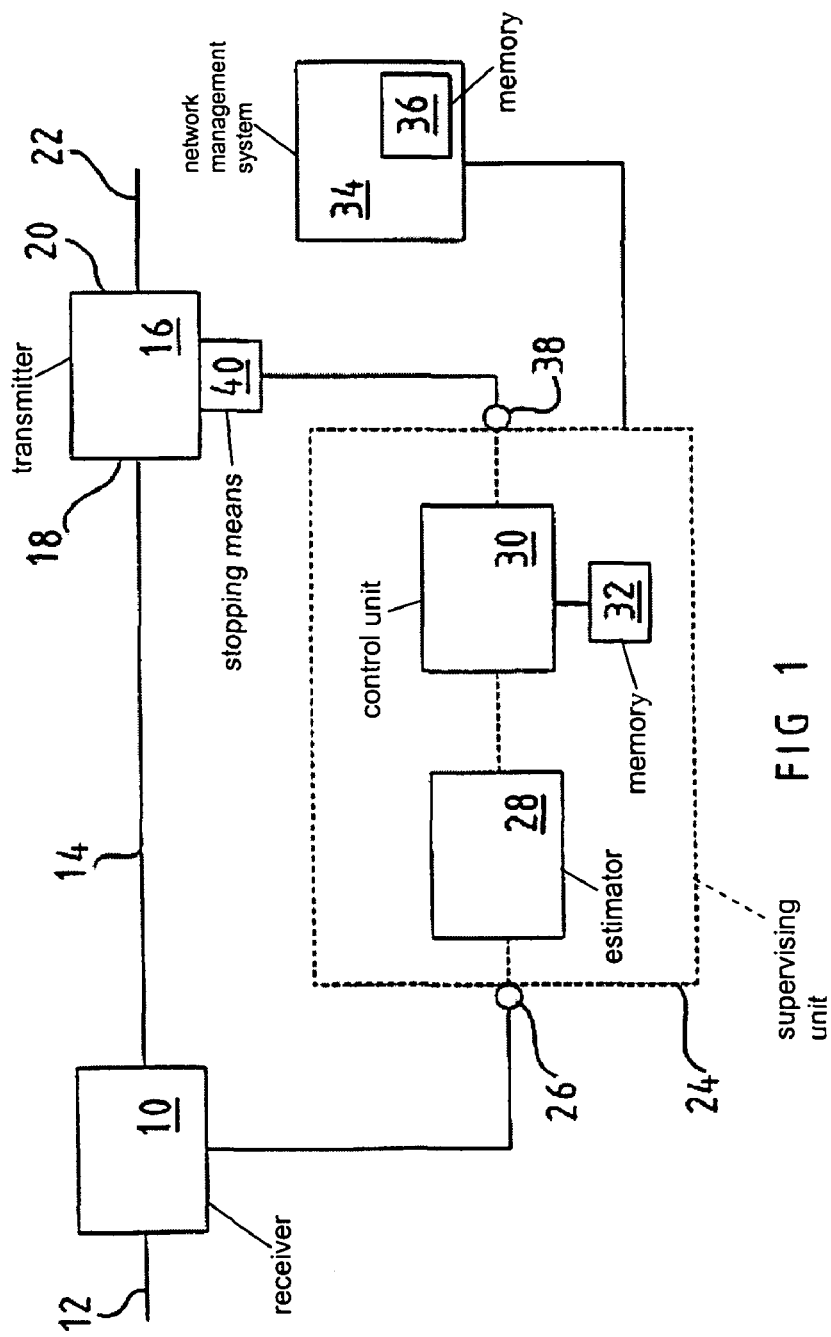

J. Christoph Scheytt et al., A 0.155, 0.622, and 2.488 Gb/s Automatic Bit Rate Selecting Clock and Data Recovery IC for Bit Rate Transparent SDH-Systems, 1999 IEEE International Solid State Circuits Conference, Digest of Technical Papers, ISSCC, pp. 348-349, Feb. 1999.

M. Ushirozawa et al., Bit-Rate-Independent SDH/SONET Regenerator for Optical Network, ECOC 97, 11th Conference on Integrated Optics and Optical Fibre Communications and 23rd European Conference on Optical Communications, Conference Publication No. 448, pp. 25-28, 1997.

* cited by examiner

ARRANGEMENT FOR SUPERVISING AND/OR CONTROLLING THE BIT RATE OF DATA PULSES

BACKGROUND OF THE INVENTION AND PRIOR ART

Within modern communication technology, signals are often sent over optical conduction paths, for example in optical fibres. A communication system normally comprises different interfaces for influencing, converting or amplifying the signals that are sent along the conduction path. Such interfaces may for example be arranged between different kinds of fibres, between a line for electrical signals and a line for optical signals, between fibres for different optical wavelengths etc. Interfaces of such and similar kinds may often with a common name be called "media converters". A media converter that transmits optical signals to an optical conduction path normally includes an optical emitter that receives electrical signals on an input side and that emits these signals as optical signals.

For example EP-A-403455 describes an arrangement that comprises an interface that receives signals from a multimode fibre, that converts these signals to electrical signals and that with the help of a transmitter, transmits optical signals on a single mode fibre.

In a communication system, signals may often be transmitted with different speed of transmission. Different speeds of transmission means that different amounts of information may be transmitted per time unit. The speed of transmission is often measured in the number of bits per second. It is often desirable to supervise or limit the speed of transmission along a communication path. For example, it may be the case that a telecommunication or computer operator allows a client to send data over one or more optical fibres that are owned by the operator and that thereby the client pays for being able to transmit data with a certain bit rate, which corresponds to a certain amount of information per time unit. A problem thereby is that the client could increase the speed of transmission, sometimes without self being aware thereof, without the operator being informed about this fact.

It is known that it is possible to limit the speed of transmission in a communication system by means of a low pass filter, i.e. a filter that is arranged on an electric conduction path and that controls with how high frequencies signals may be transmitted on the conduction path. The above mentioned EP-A-403455 describes that the highest possible speed of transmission is controlled by means of a filter that limits the bandwidth of the transmitted signals. The document also mentions that the bandwidth of the filter may be controlled from a centre that supervises the communication system.

The use of such filters involves several problems. It is difficult to produce a filter, the bandwidth of which may be controlled from the outside and over a large frequency interval. Because of this difficulty, it is common that such filters may only be turned on or off. The production of controllable filters is expensive and complicated. Such filters do not give any sharp limit between where transmission functions and where transmission does not function. The transmission may thus in certain cases function if and only if the transmitted signals are powerful enough. The filter may thus impair the possibility to transmit signals of a high frequency (a high bit rate), but the transmission of such frequencies may still be possible under favourable circumstances, for example over a short fibre with a low attenuation.

SUMMARY OF THE INVENTION

A purpose with the present invention is to achieve an arrangement for supervising and/or controlling the bit rate of data pulses that are transmitted from a transmitter to at least one optical conduction path, with which arrangement the above described problems are avoided. Further advantages with the present invention will be clear from the following description. By the expression "controlling the bit rate" is primarily meant that the highest allowed bit rate is controlled.

The above purpose is achieved by an arrangement for supervising and/or controlling the bit rate of data pulses that are transmitted from a transmitter to at least one optical conduction path, which transmitter has an input side which receives electrical pulses from an electric connection and an output side from which light pulses are transmitted to said optical conduction path in response to the received electrical pulses, which arrangement comprises a supervising unit with at least one input which is suited to be connected to said electric connection, wherein the supervising unit is arranged to estimate or determine the bit rate of the pulses that are received at said input of the supervising unit and wherein the arrangement is arranged to carry out at least one measure which depends on a comparison between the estimated or determined bit rate and at least one predetermined value of the bit rate.

According to the invention, the bit rate is thus estimated or determined. The word "estimated" should be understood such that it is not completely necessary to exactly determine the bit rate. It is often sufficient if an approximate estimation of the bit rate is achieved. By comparing the estimated or determined bit rate with a predetermined value, it may, for example be checked whether the transmitted bit rate exceeds a bit rate that a user has the right to according to an agreement with an operator. If the transmitted bit rate exceeds the predetermined value, the arrangement carries out a suitable measure. Examples of such measures will be described below. Since the bit rate is determined or estimated and since a suitable measure is carried out, it is not necessary to install a filter of the above mentioned kind in the equipment. The problems that are involved with such filters are thereby avoided.

It should be noted that the expressions "connected to", "coupled to" or similar expressions do in the present document not necessarily mean that the different units are directly connected to each other without any further units between them. Further units may thus be arranged along the connection with which two units are "connected" to each other. It should also be noted that the feature that the supervising unit has at least one input that is suited to be connected to said electric connection, includes the possibility that this input is connected to some node in the transmitter itself, at which node electrical pulses are present.

It should also be noted that equipments for the estimation or determination of the bit rate are known per se. The English abstract of JP-A-10313277 thus describes that a bit rate detector is used to regenerate a clock signal. The article "A Programmable Rate Detector for Rapid-Reconfigrable Rate-Transparent Optical Networks" by T. C. Banwell and N. K. Cheung, presented at OFC, San Diego, February, 1999, describes a programmable bit rate detector.

According to an embodiment of the invention, the supervising unit comprises at least one output that is arranged to be connected to means with which the transmission of light pulses on said optical conduction path can be stopped, wherein the supervising unit is arranged such that said measure comprises the delivery, via said output, of a signal to said means such that the transmission of light pulses on said optical conduction path is stopped if the estimated or determined bit rate exceeds said predetermined value. The output of the supervising unit may for example be connected to a node of said transmitter in such a manner that the transmitter may be stopped by a signal from the supervising unit. It is also possible that the supervising unit is connected to separate means which are arranged to stop the transmission of signals on the conduction path either before or after the transmitter. Through this embodiment, the transmission of signals may thus be stopped if for example the bit rate exceeds the bit rate on which an operator and a user have agreed.

According to another embodiment of the invention, the supervising unit comprises a memory in which said predetermined value is stored. Since the predetermined value is stored in a memory of the supervising unit, the comparison with this predetermined value may be done by the supervising unit itself, without it being necessary to first retrieve the predetermined value from some other unit.

According to a further embodiment of the invention, the arrangement comprises a system for network management, wherein the supervising unit is connected to said system such that said predetermined value in the memory of the supervising unit can be written by a command from said system. Through this feature, the advantage is achieved that the value in the memory may be changed from one or more positions located at a long distance from the supervising unit. For example, a network operator may change the predetermined value if a new agreement has been entered with a user. The system for network management may of course be designed with the possibility to change also other functions of the supervising unit than the predetermined value in the memory.

According to a further embodiment of the invention, the arrangement comprises a system for network management that comprises a memory in which said predetermined value is stored, wherein the supervising unit is connected to said system and wherein the arrangement is arranged such that said measure is carried out in that said comparison is done with the predetermined value in said memory of said system. According to this alternative, the predetermined value is thus stored in the system for network management. The comparison may thus for example be done in that the supervising unit sends a message to the system with information about the estimated or determined bit rate. The system then carries out the mentioned comparison and a suitable measure is carried out depending on the result of the comparison.

A measure may thereby be the one described above, that is that the supervising unit has at least one output that is arranged to be connected to means with which the transmission of light pulses on said optical conduction path can be stopped, wherein the arrangement is arranged such that said measure comprises the delivery, via said output, of a signal to said means such that the transmission of light pulses on said optical conduction path is stopped if the estimated or determined bit rate exceeds said predetermined value. The measure of stopping the transmission may thus in this case be initiated in that the system sends a command to the supervising unit that the supervising unit should stop the transmission.

According to a further embodiment of the invention, the arrangement is arranged such that said measure means that an annotation is done in a memory of said system if the estimated or determined bit rate exceeds said predetermined value. In this case it is thus not necessary to stop the transmission. Instead it is for example possible to debit the user for the used bit rate with the help of the annotation in the system.

According to a further embodiment of the invention, the supervising unit comprises a frequency divider with an input that is suited to be connected to said electric connection. By such a frequency divider, the frequency may be divided into a lower frequency that is easier to handle at the estimation or determination of the bit rate.

According to a further embodiment of the invention, the supervising unit comprises a micro-controller or a programmable logical circuit (also called a PLD=Programmable Logic Device) that is connected to an output of said frequency divider. By the combination of a frequency divider and a micro-controller, the bit rate may be estimated or determined in a simple and inexpensive manner. By "micro-controller" is here meant some smaller computer unit that comprises a processor unit and some further equipment. A micro-controller normally constitutes only one circuit. A micro-controller is sometimes also called a micro-processor.

According to a further embodiment of the invention, the supervising unit comprises a voltage divider with an input that is suited to be connected to said electric connection and with an output that is connected to said frequency divider. By such a voltage divider, the amplitude of the incoming signals may be adjusted to a suitable frequency divider.

A further embodiment of the invention is clear from claim 11. According to this embodiment, the arrangement thus comprises a memory and is arranged such that the bit rate is estimated or determined repeatedly and such that at least some of the thereby estimated or determined bit rates are stored in said memory. According to this embodiment, it is not necessary to perform a comparison with a predetermined value of the bit rate. Suitably, the bit rates are estimated/determined at regular intervals, this could for example take place once a second. Also longer time intervals are possible, for example at least one time per day or at least one time per week. Based on the stored values in the memory, a user may then be debited in dependence on the bit rates that have been used. The memory in which the bit rates are stored may suitably be arranged in a system for network management. The estimated/determined bit rates may be stored in the memory at each occasion when the estimation/determination is done, alternatively the storing may be done only if the bit rate has been changed compared to a previously stored value, i.e. a comparison is done with a previously stored value. It should be noted that the embodiments defined in claims 11 and 12 may also be combined with the further features according to one or more of the above described embodiments.

SHORT DESCRIPTION OF THE DRAWINGS

The invention will now be described by means of embodiments and with references to the annexed drawings.

Figure 2:
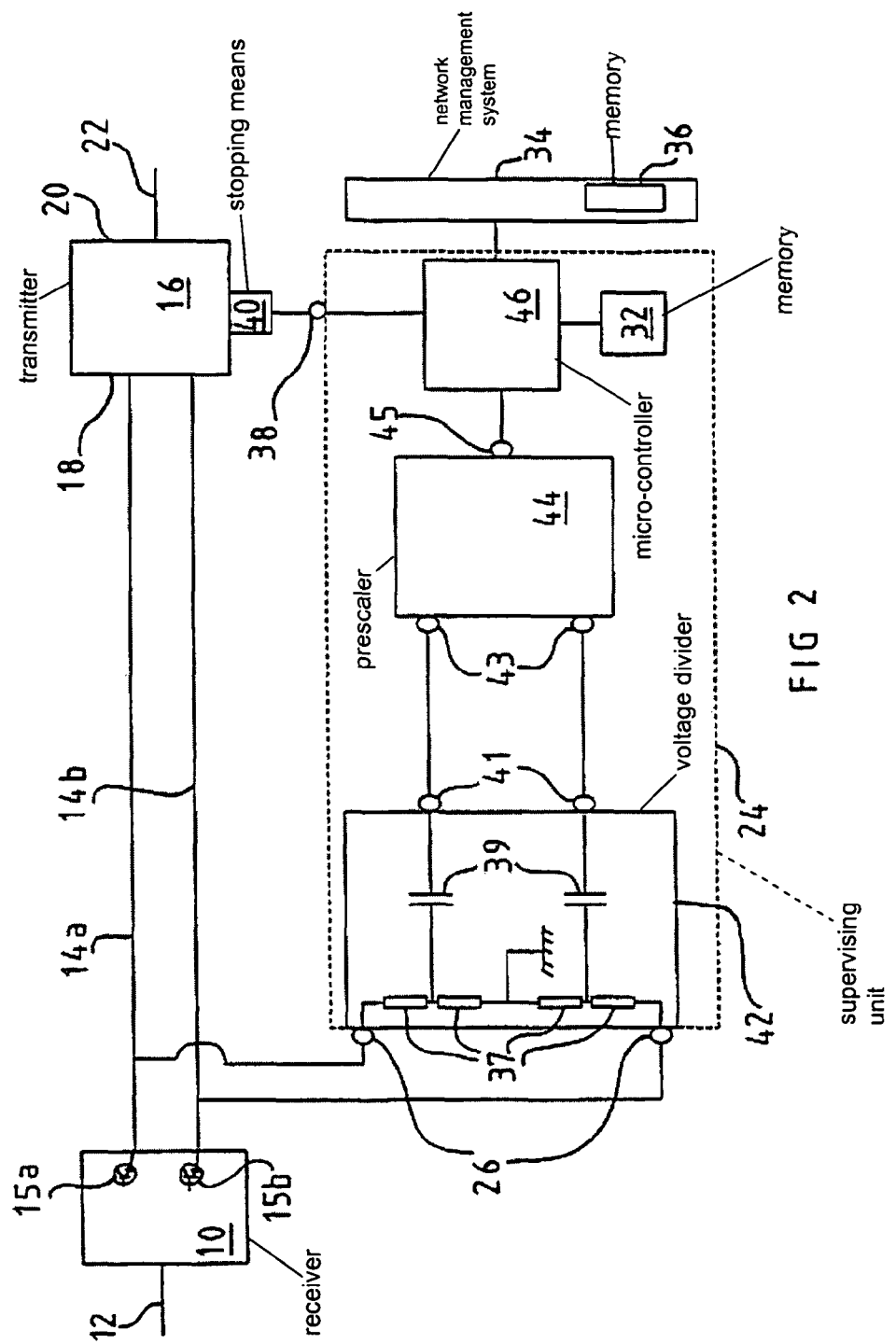

FIG. 1 shows schematically an embodiment of the invention by means of block diagram FIG. 2 shows schematically a further example of an embodiment of the invention

DESCRIPTION OF EMBODIMENTS OF THE INVENTION

FIG. 1 shows an embodiment where the present invention is applied in connection with a media converter of the kind that comprises a receiver 10 that receives data signals from a first line 12. This first line 12 may for example constitute an optical fibre or a conductor where electrical signals are transmitted. A further example is that the receiver 10 receives radio signals. The receiver 10 transmits electrical pulses on an electric connection 14 that is connected to a transmitter 16.

The transmitter 16 thus has an input side 18 that receives electrical pulses. The transmitter comprises an output side 20 from which data pulses are transmitted as light pulses on an optical conduction path 22. The transmitter 16 thus converts the electrical pulses to optical pulses. The optical conduction path 22 may for example consist of single mode fibre. The first line 12 could for example be a multi-mode fibre.

The elements described so far may thus together constitute a kind of media-converter.

It should be noted that the concepts "light" and "optical", such as used in this description, should not be interpreted to be limited to a certain wavelength range. The mentioned light does thus not necessarily have to be within the visible spectrum.

The arrangement according to the invention in its simplest form comprises a supervising unit 24. The supervising unit 24 has an input 26 that is connected to the electrical connection 14. The input 26 may be connected to a node in the receiver 10, to the output of the receiver 10, to the connection between the receiver 10 and the transmitter 16 or to an inner node in the transmitter 16. When it is said that the input 26 is connected to the electrical connection 14 all these possibilities are thus included. The input 26 should however be connected to a section or a node where the signals are present as electrical pulses. If the first line 12 conducts electrical data pulses, the receiver 10 is not always necessary. In this case, the first line 12 may be connected directly to the transmitter 16, which thus functions as a converter that converts the electrical signals to optical signals.

The supervising unit 24 is arranged to estimate or to determine the bit rate of the pulses that are received at said input 26 of the supervising unit 24. For this purpose, the supervising unit 24 comprises, according to an embodiment of the invention, a bit rate estimator 28. An example of such a bit rate estimator 28 will be described below in connection with FIG. 2. A bit rate estimator 28 is thus a unit with which the bit rate may be determined or at least estimated.

The arrangement according to the invention is arranged to carry out at least one measure that depends on a comparison between the estimated or determined bit rate and at least one predetermined value of the bit rate. For this purpose, the supervising unit 24, according to the embodiment shown in FIG. 1, comprises a control unit 30. This control unit 30 may for example constitute a micro-controller or a programmable logical circuit. The supervising unit 24 also comprises a memory 32 in which said predetermined value is stored. This memory 32 may for example be included in the control unit 30. The predetermined value may for example constitute a predetermined highest bit rate that a user has the right to transmit on the optical conduction path 22 according to an agreement with an operator that rents the optical conduction path 22 to the user.

The arrangement also comprises a system 34 for network management. With such a system 34, for example the system operator may communicate with different units, inter alia with the control unit 30. The communication may take place via the fibre network where the fibre 22 is included or via another cable or network connection, for example via the Internet. With the help of the system 34, the predetermined value in the memory 32 of the supervising unit 24 may be modified. According to an alternative embodiment, the arrangement does not comprise any system 34 for network management. In this case, for example the value in the memory 32 in the supervising unit 24 may instead be modified by adjusting an adjustment device, for example in the form of a DIP-switch (DIP=Dual In-line Package), arranged at the supervising unit 24.

According to another alternative embodiment, the predetermined value is stored in a memory 36 of the system 34 for network management. In this case, the control unit 30 may send the estimated or determined bit rate to the system 34. Said comparison is thereby suitably carried out in the system 34.

The supervising unit 24 has output 38 that is connected to means 40 with which the transmission of light pulses of said optical conduction path 22 may be stopped. This means 40 may suitably be included as a part of the transmitter 16.

The supervising unit 24 is for example arranged such that a signal is delivered via the output 38 to the means 40 for stopping the transmission of light pulses on the optical conduction path 22 if the estimated or determined bit rate exceeds said predetermined value.

Alternatively, the arrangement may be arranged such that an annotation is done in a memory 36 of the system 34 if the estimated or determined bit rate exceeds said predetermined value. The user may thereby be debited for the used bit rate.

FIG. 2 shows a further embodiment of the invention. This embodiment is based on the idea that a kind of meter is used that determines the frequency or the number of transitions in the data flow. For example, a 1 in the data flow that is preceded by a 0 may constitute a transition (for example a voltage pulse edge with a positive derivative), while a 0 preceded by a 0 is not a transition. A problem thereby is that a sequence of 1s and 0s according to for example 110011001100 . . . with a first bit rate may not be distinguished from the sequence 101010 . . . with half this bit rate. However, this limitation only leads to an underestimation of the real bit rate. A user does therefore not risk that the transmitter of the user is stopped because of the fact that the bit rate has been calculated to be higher than it really is.

As an example, we may assume that the data flow has the speed 1000 Mbit/s. If the data pulses were to be transmitted with 100% probability of transition according to the pattern 1010101010 . . . a frequency meter would measure the frequency 500 MHz. In many systems, the 1s and the 0s are apparently randomly distributed, which means that the probability of a transition is 50%. This leads to the fact that the frequency meter measures the frequency 250 MHz. A simple embodiment of the invention that is based on the use of a frequency meter or "a transition speed detector" is shown in FIG. 2.

The receiver 10 receives data signals on the line 12. According to the shown embodiment, the receiver has PECL outputs (PECL=Positive Emitter Coupled Logic) to two conductors 14a, 14b. It is of course possible that the circuit has another design, for example with single conductors. The outputs from the receiver 10 are symbolised by two transistors 15a, 15b. The outputs from the receiver 10 are connected to a transmitter 16 in a similar manner as according to FIG. 1.

The supervising unit 24 comprises according to this example a voltage divider 42, a so called prescaler 44 and a micro-controller 46 (instead of a micro-controller, a programmable logical circuit may be used). The voltage divider 42 divides the voltage amplitude to a level suitable for the prescaler 44. The voltage divider 42 comprises according to this embodiment four resistors 37. Furthermore, the voltage divider 42 comprises two capacitors 39. These capacitors 39 do of course not need to form a part of the voltage divider 42 itself. It is not always necessary that the supervising unit 24 comprises a voltage divider 42. The prescaler 44 is a simple and inexpensive kind of a frequency divider. Such a prescaler 44 has a low current consumption, for example 2 mA at 5V supply voltage. The prescaler 44 may for example divide the incoming frequency by 128. An example of a prescaler 44 is the one that may be obtained through Motorola with the model name MC 12052A.

The prescaler 44 can receive high frequencies at its input, for example above 1 GHz. The prescaler 44 divides the frequency into a lower frequency, for example, lower than 10 MHz. Such a low frequency may be directly connected to an inexpensive micro-controller 46. Possibly, the supervising unit 24 may comprise a further frequency divider between the prescaler 44 and the micro-controller 46 if further frequency division is necessary. Such a micro-controller 46 comprises a frequency divider, which means that the frequency that the micro-controller receives may be measured exactly with the timer-circuits that are included in the micro-controller 46.

The micro-controller 46 is in a similar manner as described above connected to means 40 for stopping the transmission of light pulses on the optical conduction path 22. The micro-controller 46 may also comprise a memory 32 in which said predetermined value is stored. In other respects, the arrangement according to FIG. 2 works in a similar manner as the arrangement according to FIG. 1. It may thus be said that the bit rate estimator 28 according to FIG. 1 corresponds to the voltage divider 42, the prescaler 44 and a part of the micro-controller 46 in FIG. 2.

The arrangement according to FIG. 2 may also comprise a system 34 for network management with a memory 36 according to what has been described above.

According to one embodiment, the arrangement comprises at least one memory 36, suitably arranged in the system 34 for network management such as has been described above, wherein the arrangement is arranged such that the bit rate is estimated or determined repeatedly and such that at least some of the thereby estimated or determined bit rates are stored in said memory. Based on the stored values in the memory, a user may then be debited depending on the bit rates that have been used. The estimated/determined bit rates may be stored in the memory at each occasion when the estimation/determination is done, alternatively the storing may take place only if the bit rate has been changed compared to a previously stored value, i.e. a comparison is done with a previously stored value.

As is clear from the description above, the arrangement may either be arranged such that the transmission of light pulses on the optical conduction path 22 may be stopped if the bit rate exceeds a predetermined value or such that an annotation is done in a memory 36 (which may be done at regular intervals or only if the bit rate exceeds a predetermined value). It is of course also possible that the arrangement is arranged such that there is both a possibility to stop the transmission and such that an annotation is done in a memory.

The invention is not limited to the shown embodiments but may be varied and modified within the scope of the following claims.

The invention claimed is:

1. An arrangement for supervising and/or controlling the bit rate of data pulses that are transmitted from a transmitter (16) to at least one optical conduction path (22), which transmitter (16) has an input side (18) which receives electrical pulses from an electric connection (14) and an output side (20) from which light pulses are transmitted to said optical conduction path (22) in response to the received electrical pulses, which arrangement comprises a supervising unit (24) with at least one input (26) which is suited to be connected to said electric connection (14), characterised in that the supervising unit (24) is arranged to estimate or determine the bit rate of the pulses that are received at said input (26) of the supervising unit (24) and in that the arrangement is arranged to carry out at least one measure which depends on a comparison between the estimated or determined bit rate and at least one predetermined value of the bit rate, wherein the arrangement is arranged such that said measure means that either the transmission of light pulses on said optical conduction path (22) is stopped or that an annotation is done in a memory (36), wherein the supervising unit (24) is arranged to estimate or determine the bit rate of the pulses that are received at said input (26) of the supervising unit (24) by determining the frequency of the number of transitions in the data flow.

2. An arrangement according to claim 1, wherein the supervising unit (24) comprises at least one output (38) that is arranged to be connected to means (40) with which the transmission of light pulses on said optical conduction path (22) can be stopped, wherein the supervising unit (24) is arranged to, via said output (38), deliver a signal to said means (40) such that the transmission of light pulses on said optical conduction path (22) is stopped if the estimated or determined bit rate exceeds said predetermined value.

3. An arrangement according to claim 1, wherein the supervising unit (24) comprises a memory (32) in which said predetermined value is stored.

4. An arrangement according to claim 3, comprising a system (34) for network management, wherein the supervising unit (24) is connected to said system (34) such that said predetermined value in the memory (32) of the supervising unit (24) can be written by a command from said system (34).

5. An arrangement according to claim 1, comprising a system (34) for network management that comprises a memory (36) in which said predetermined value is stored, wherein the supervising unit (24) is connected to said system (34) and wherein the arrangement is arranged such that said measure is carried out in that said comparison is done with the predetermined value in said memory (36) of said system (34).

6. An arrangement according to claim 5, wherein the supervising unit (24) comprises at least one output (38) that is arranged to be connected to means (40) with which the transmission of light pulses on said optical conduction path (22) can be stopped, wherein the arrangement is arranged to, via said output (38), deliver a signal to said means (40) such that the transmission of light pulses on said optical conduction path (22) is stopped if the estimated or determined bit rate exceeds said predetermined value.

7. An arrangement according to claim 4, arranged such that an annotation is done in a memory (36) of said system (34) if the estimated or determined bit rate exceeds said predetermined value.

8. An arrangement according to claim 1, wherein the supervising unit (24) comprises a frequency divider (44) with an input (43) that is suited to be connected to said electric connection (14).

9. An arrangement according to claim 8, wherein the supervising unit (24) comprises a micro-controller or a programmable logical circuit (46) that is connected to an output (45) of said frequency divider (44).

10. An arrangement according to claim 8, wherein the supervising unit (24) comprises a voltage divider (42) with an input (26) that is suited to be connected to said electric connection (14) and with an output (41) that is connected to said frequency divider (44).

11. An arrangement for supervising and/or controlling the bit rate of data pulses that are transmitted from a transmitter (16) to at least one optical conduction path (22), which transmitter (16) has an input side (18) which receives electrical pulses from an electric connection (14) and an output side (20) from which light pulses are transmitted to said optical conduction path (22) in response to the received electrical pulses, which arrangement comprises a supervising unit (24) with at least one input (26) which is suited to be connected to said electric connection (14), characterised in that the supervising unit (24) is arranged to estimate or determine the bit rate of the pulses that are received at said input (26) of the supervising unit (24) and in that the arrangement comprises at least one memory (36) and is arranged such that the bit rate is estimated or determined repeatedly and such that at least some of the thereby estimated or determined bit rates are stored in said memory (36), wherein the supervising unit (24) is arranged to estimate or determine the bit rate of the pulses that are received at said input (26) of the supervising unit (24) by determining the frequency of the number of transitions in the data flow.

12. An arrangement according to claim 11, comprising a system (34) for network management, wherein the supervising unit (24) is connected to said system (34) and wherein said memory (36) is arranged in said system (34).

* * * * *